(12) United States Patent
Nikovski et al.

(10) Patent No.: US 11,161,244 B2
(45) Date of Patent: Nov. 2, 2021

(54) SYSTEM AND METHOD FOR AUTOMATIC ERROR RECOVERY IN ROBOTIC ASSEMBLY

(71) Applicant: Mitsubishi Electric Research Laboratories, Inc., Cambridge, MA (US)

(72) Inventors: Daniel Nikolaev Nikovski, Brookline, MA (US); Devesh Jha, Cambridge, MA (US); Diego Romeres, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 360 days.

(21) Appl. No.: 16/253,585

(22) Filed: Jan. 22, 2019

(65) Prior Publication Data

US 2020/0230815 A1 Jul. 23, 2020

(51) Int. Cl.
  *G05B 19/402* (2006.01)
  *B25J 9/16* (2006.01)
  *G06N 7/00* (2006.01)

(52) U.S. Cl.
  CPC ............ *B25J 9/1653* (2013.01); *B25J 9/163* (2013.01); *B25J 9/1633* (2013.01); *B25J 9/1674* (2013.01); *B25J 9/1687* (2013.01); *G05B 19/402* (2013.01); *G06N 7/005* (2013.01); *G05B 2219/31081* (2013.01)

(58) Field of Classification Search
  CPC ........ B25J 9/1653; B25J 9/163; B25J 9/1633; B25J 9/1674; B25J 9/1687; G05B 19/402; G05B 2219/31081; G05B 2219/40223; G05B 2219/40599; G06N 7/005
  USPC ........................................................ 700/114
  See application file for complete search history.

(56) References Cited

U.S. PATENT DOCUMENTS

| | | | |
|---|---|---|---|
| 2014/0114477 A1* | 4/2014 | Sato ........................ | B25J 9/1687 700/250 |
| 2018/0043540 A1* | 2/2018 | Satou ...................... | B25J 9/1633 |

* cited by examiner

*Primary Examiner* — Michael J Brown
(74) *Attorney, Agent, or Firm* — Gennadiy Vinokur; Hironori Tsukamoto

(57) ABSTRACT

A system for controlling a robotic arm performing insertion of a component along an insertion line accepts measurements of force experienced by the wrist of robotic arm at current position along insertion line and determines probability of value of the force conditioned on the current value of the position according to a probabilistic relationship for the force experienced by the wrist of the robotic arm along the insertion line as a probabilistic function of the positions of the wrist of the robotic arm along the line of insertion. The probabilistic function is learned from measurements of the operation repeatedly performed by one or multiple robotic arms having the configuration of the robotic arm under the control. The system determines a result of anomaly detection based on the probability of the current value of the force and controls the robotic arm based on the result of anomaly detection.

20 Claims, 12 Drawing Sheets

SYSTEM AND METHOD FOR AUTOMATIC ERROR RECOVERY IN ROBOTIC ASSEMBLY

TECHNICAL FIELD

This invention is related to robotic assembly and specifically to automatic detection of anomalous insertions during robotic assembly of a product.

BACKGROUND

With improvements in sensing and actuation as well as computing capabilities, the role of robots in automated assembly has undergone huge improvements. Robotic assembly is widely used for assembly tasks in automobile industry as well as assembly of more delicate components for manufacturing computer circuit boards, phones, etc. Automatic error recovery from faults forms an integral part of these robotic applications. Anomaly detection-based automatic error recovery is helpful to maintain productivity requirements as well as the desired specifications for the assembled product.

In a number of these applications, a robot operates in a repetitive fashion following a sequence of operations to assemble a product from a set of parts by application of a pre-defined set of actions. These pre-defined actions do not, in general, take into account the uncertainty and imprecision in robot's behavior. However, these unpredictable behaviors can lead to undesirable faulty assembly of the final product and thus, recovery from these errors becomes important for an autonomous assembly task. Consider, for example, insertion of electric harnesses into circuit boards. The electric harnesses have very small clearances and thus, any uncertainty in the robotic motion can result in jamming or misalignment of the connectors and thus lead to a faulty connection. Detection of such faulty attempts to assemble two (or more) parts during assembly is a prerequisite for any corrective action for recovery from these faults. These anomalies can occur for a multitude of reasons in these robotic systems. Some possible examples are faulty behavior of the robot due to possible measurement noise, faults accumulated to thermal expansion in the robot, misalignment of the parts being assembled during assembly, faults in the part being assembled along the assembly line, etc. As a result, there are several sources of uncertainty in the assembly process, and having an automatic anomaly detection algorithm can improve the efficiency of these autonomous operations.

An insertion-type of robotic assembly is very widely used for manufacturing a variety of electronic equipment such as computers, mobile phones, etc. These tasks are generally characterized by low tolerances of the parts being mated, and thus require high precision during assembly. An early detection of fault in the mating during the insertion process can minimize the amount of damage to the products during assembly. The automatic error recovery methods utilizing fault detection, also referred as anomaly detection, during the robotic insertion can be broadly divided into model-based and data-driven methods.

In the model-based methods for fault detection during the robotic insertion, a model using physical knowledge of the process is created. These models can predict the profile of measured forces during different phases of the insertion process, and are used online to detect any deviation from the predicted force profile. See, e.g., "Model-Based Intelligent Fault Detection and Diagnosis for Mating Electric Connectors in Robotic Wiring Harness Assembly Systems" by Jiam Huang, Toshio Fukuda and Takayuki Matsuno (IEEE Transactions on Mechatronics, Vol-13, Issue-1)."

However, model-based methods suffer from the inherent uncertainty in the process. To overcome this shortcoming, some implementations estimate the bounds on parameters of the model that ensure normal mating. The parameters of the model are then estimated online from the observed data, and an anomaly is detected if the parameters do not satisfy these bounds. While these modifications improve the robustness of these techniques, they increase the complexity of the underlying technique. This limits real-time, effective use of most of the model-based techniques. Furthermore, creating physics-based models for these processes requires a lot of domain knowledge, and could be infeasible for a lot of complex applications.

There is a range of techniques that make use of data-driven modeling to detect anomalies during robotic insertion. For example, one method uses a threshold on the maximum force or torque observed during the insertion. However, this method suffers from excessive amounts of false alarms (i.e., incorrect positive detection). A robot can deviate from the normal trajectory at any point during the insertion process and thus, a position-independent threshold achieves sub-optimal performance.

Some other methods address this problem by using a hierarchical decision rule that first decides the phase of the insertion process, e.g., direction of approach, mating, retraction, etc., and then decide whether the phase is normal or faulty. These techniques make use of a hierarchical classification approach, and thus decompose the uncertainty involved in the process by making different models for each phase. However, these methods are sensitive to process noise caused by uncertainties of the insertion process and may be inaccurate in some situations. See, e.g., see the paper "A Study on Error Recovery Search Strategies of Electronic Connector Mating for Robotic Fault-Tolerant Assembly" by Fei Chen, Ferdinando Cannella, Jian Huang, Hironobu Sasaki and Toshio Fukuda (Journal of Intelligent & Robotic Systems)"

Accordingly, there is a need for data-driven automatic error detection and recovery system and method that explicitly considers the uncertainties involved during the insertion process in a robotic assembly. However, there are challenges related to the efficiency of the data-driven model related to both the accuracy and the computational complexity of the models.

SUMMARY

An insertion-type of robotic assembly using a robotic arm having a wrist with a gripper is widely used for performing an insertion of a component to assemble a variety of products, such as electronic equipment including computers and/or mobile phones. Such an assembly is typically performed in an open-loop fashion by the robot, where parts of the robot move along predefined trajectories by applying a given sequence of control inputs to achieve the final desired assembled product. With the recent improvements in sensing technologies, the force experienced by the robot while attempting the desired assembly could be measured. These sensors are generally mounted on the wrist joint of the robot and can measure the force tensor experienced by the end-effector of the robot during a manipulation operation. There is a need for machine learning-based anomaly detection algorithms, which can interpret the data measured by the force sensor and correct/alarm the anomalous attempts for robotic assembly.

It is an object of some embodiments to provide a system and a method for detecting anomalous attempts of robotic assembly, in real-time, from measurements of a force sensor mounted on the robot. For example, the force sensor can be mounted on the wrist of the robot to make measurements of the force experienced by the robot performing an insertion of a component to assemble a product. It is another object of some embodiments to provide an automatic error recovery using data-driven model of the expected behavior of the force profile along the trajectory of the robot's end-effector while allowing for uncontrollable uncertainties introduced by process noise in the robotic assembly. For example, one embodiment discloses an automatic error recovery that takes advantage of a probabilistic functional model for the expected force profile along the trajectory of the robot during the normal (successful) insertion processes.

Some embodiments are based on the recognition that data-driven anomaly detection during the insertion process is typically deterministic due to the complexity of measurements of the force sensor. Specifically, the force tensor includes measurements of forces and moments along the axis of the robot (Fx, Fy, Fz, Mx, My, Mz) in addition to position and orientation along three axis. Thus measurement space provided by the sensor is at least 12 dimensional (or 18 dimensional, when velocities along all the axis are considered). Hence, even if the deterministic anomaly detection fails to consider uncertainties involved during the insertion process and thus are not robust to process noise, a probabilistic anomaly detection that models the joint distribution of all the force and moments experienced during the insertion process is a high dimensional probability density modeling problem, which is generally data inefficient.

To reduce the computational complexity of the associated problem, some embodiments based on discovery performed with a help of an exploratory data analysis (EDA), that there is a stable relationship or regularity present between certain measured variables during connector mating experiments. This leads to several surprising understandings pertinent to the underlying anomaly detection problem. Some embodiments are based on realization that there is a stable relationship between the force experienced along the direction of approach for component insertion and position along the same direction. The relationship is stable, probabilistic, and allows for a lower dimensional functional relationship compared to joint probability distribution.

Specifically, some embodiments are based on the realization and experimental discovery that for each value of position along an insertion line, there is a probability distribution (due to the noisy measurements) of the force that is conditioned only on the position on the insertion line, and independent of any other measured variable (i.e., Fx, Fy, or the moment components). Also, this probabilistic relationship is independent of time, i.e., during normal operation, the forces experienced by the robot's wrist (that is measured by the force sensor) is independent of the velocity with which the robot is moving. As a result of this experimental discovery, some embodiments are able to reduce the original 12 (or 18) dimensional problem to just two dimensions of force vs. positions on the insertion line. As used herein, the line of insertion defines a trajectory of motion of the component being inserted and/or a trajectory of motion of a component rigidly connected to the inserted component. Example of such a rigidly connected component is a wrist of a robotic arm of a robotic assembly. In effect, the dimensionality reduction brought by plotting the relationships with respect to the insertion line allows embodiments to use probabilistic data-driven anomaly detection that was previously computationally prohibitive.

To that end, some embodiments perform automatic anomaly detection using a probabilistic relationship for a force experienced by the wrist of a robotic arm along a line of insertion as a probabilistic function of a position of the wrist of the robotic arm along the line of insertion. During the operation of the robotic arm, at a current instance of time, the embodiments determine a probability of the current force conditioned on the current position of the wrist of the robotic arm according to the probabilistic function and determine a result of anomaly detection based on the probability of the current value of the force. In effect, the embodiments allow to perform more probabilistic detection in real time with practical computational requirements.

Some embodiments learn the probabilistic function online and/or offline from the measurements of the operation repeatedly performed by one or multiple robotic arms having the configuration of the robotic arm under the control. For example, one embodiment models this probabilistic relationship in two dimensions of position and force using a probabilistic regression technique. The probabilistic function defines a probability distribution of force values for each value of the position along the insertion line. The positon along the insertion line can be continuous values. However, as a practical matter, the values of the position along the insertion line are quantized with some resolution to form a sequence of values of positions. For example, in some embodiments, the resolution of the values is governed by the resolution of the force sensor. The probability distribution of the force values allows to estimate a likelihood or probability of the current value of the force conditioned on the current value of the position. In effect, this allows probabilistic anomaly detection, which is more accurate, because it considers uncertainties of measurements and insertion process.

Some embodiments are based on recognition that the probabilistic function that estimates the distribution of the force as a function of the position can be determined using various regression techniques, such as least square support vector regression formulation with confidence interval estimation. Some of these techniques, however, are limited to independent and identically distributed (i.i.d.) measurements. Some embodiments are based on realization that in some situations of automatic robotic assembly, the force experienced by the robot depends on the trajectory of the robot to mate the parts together and thus an i.i.d model of the measurements may be inaccurate. Consequently, in those situations, there is a need for different regression techniques.

Some embodiments use probabilistic function defining a conditional probability distribution such that a probability distribution of the force at a position is conditioned on a previous probability distribution of the force at a previous position. In effect, such conditional probabilistic relationships increase the accuracy of anomaly detection. Examples of regression techniques allowing to determine a probabilistic function having a conditional probability distribution include Gaussian process regression.

Some embodiments are based on recognition that learning the probabilistic function defining a conditional probability distribution can be time and computationally expensive process. For example, a conditional probability distribution can be represented by a number of parameters defining a probability density function for each value of the position along the insertion line. Learning all these parameters for each value of position can be computationally expensive. Thus, there is a need to reduce computational requirements for learning the probabilistic function.

To that end, some embodiments model the underlying stable relationship between the force experienced by the robot along the direction of insertion and the position along that direction using a Gaussian process regression. A Gaussian process regression is a non-parametric statistical model where every point in the input space is associated with a normally distributed random variable. More concretely, a Gaussian process is a collection of random variables, any finite number of which is represented by a joint Gaussian distribution. As a result, a Gaussian process is completely defined by only two parameters, i.e., their mean and covariance function (also known as the kernel function). After the hyperparameters of the Gaussian process are estimated, the probability distribution of the function at any test point can be predicted using the learned regression model. To that end, some embodiments determine the probabilistic function by learning the kernel function parameterized on position along the line of insertion. In such a manner, force distribution at any test point along a trajectory is completely defined by the mean and covariance obtained from the Gaussian process. In effect, modeling the probabilistic function as the Gaussian process regression reduces computational requirements for learning the probabilistic relationships between the force and the position on the insertion line.

Some embodiments are based on the realization that learning the regular Gaussian process regression can still be computationally expensive for some situations. The computational complexity of the learning varies as $O(n^3)$ where, 'n' is the number of data points. To make learning computation more efficient, some embodiments learn local Gaussian process regressions to reduce computational complexity by fitting several Gaussian process models to the data. The embodiments provide a final prediction by using an expectation over all the local Gaussian process models. The local Gaussian process models reduce computational time required to learn the model by splitting the problem into several sub-problems with size $n_i<n$ (i=1, 2, ..., m) and use these 'm' models to make a prediction. Each of the local model is fitted to a certain cluster in the dataset. Some embodiment estimates the clusters in the data using clustering techniques such as k-mean clustering or Gaussian mixture models. The input argument to these clustering techniques is the number of clusters—the final performance of the local Gaussian process model depends on the number of clusters chosen and thus it is treated as a hyperparameter for the local Gaussian process models. After all the clusters and cluster centroids are estimated, the hyperparameters for all 'm' Gaussian processes are estimated using the regular marginal negative likelihood method for Gaussian processes. During the training, a prediction for the test data point is obtained by estimating a weighted average of the predictions made by the 'm' Gaussian process models and the weights are given by the distance between the 'm' cluster centroids and the test data point. The distance can be estimated using a kernel which takes as an argument two vectors and outputs a scalar value—some common choice is the radial basis function or the regular Euclidean distance between vectors.

After the probabilistic function that estimates the distribution of the force as a function of the position is learned, some embodiments estimate an anomaly score for an insertion using the probabilistic function for the insertion force. Notably, the Gaussian process associates every finite combination of variables in the input with a multivariate Gaussian distribution to estimate the probability of a new observation. Using this property of GP, the prediction at a new test data point using GP is given by a Gaussian distribution. Hence, some embodiments determine a probability of the current force conditioned on the current position according to the probabilistic function—this is obtained using the parameters of the Gaussian distribution and the observed force measurement. Furthermore, using a confidence level as a threshold for minimum value of a probability of force to be considered normal, some embodiments compute the confidence interval for the expected measurements along the robot trajectory based on the obtained probability distribution at that point.

Different implementations use different computations of anomaly score. For example, in some implementations, three possible anomaly score for a specific point along the trajectory are considered, namely binary anomaly score, continuous anomaly score and hybrid anomaly score. In the binary anomaly score implementation, a force measurement is given an anomaly score of one if it lies outside of the confidence interval, and a score of zero if it lies within the confidence interval. In the continuous anomaly score implementation, a force measurement is given an anomaly score corresponding to how likely it is to observe such value given the corresponding multivariate Gaussian probability distribution. This value is computed as 1 minus the evaluation of the multivariate Gaussian probability distribution at the specific force measurement. In the hybrid anomaly score implementation, a force measurement is given an anomaly score of zero if it lies within the confidence interval and a score higher than zero, computed as in the continuous anomaly score, if it lies outside of the confidence interval. With all and each of these implementations the total anomaly score for the entire insertion can be obtained by averaging the anomaly scores for all the points along the observed test trajectory. The proposed anomaly detection algorithm is agnostic to the choice of the anomaly score computation. Notice also that several others continuous anomaly scores can be selected and therefore applied also to the hybrid anomaly scores depending e.g. on the variance of the multivariate Gaussian distribution or on the likelihood function. Some embodiment determine a result of anomaly detection based on comparison of the probability with an anomaly detection threshold, e.g., declare anomaly when the probability is above the anomaly detection threshold.

A probability distribution can be associated with confidence intervals, which provide an estimated range of values which is likely to include an unknown parameter, the estimated range being calculated from a given set of sample data. Confidence intervals are associated with a confidence level, say $\alpha$, where $\alpha$ is a positive number below 1. For a Gaussian distribution, the confidence interval can be completely estimated using the mean and variance of the distribution. These confidence intervals at every point along a trajectory of the robot provide the allowed operating margin for the force experienced during a normal insertion operation.

Some embodiment determines an anomaly detection threshold using a Receiver Operator Characteristic (ROC) curve for the detection process. This design is done to strike a trade-off between the positive detection rates and the allowable false alarm rates. This embodiment can place a bound on the undesirable false alarm rate.

Some embodiments perform automatic error recovery by controlling the robotic arm based on the result of anomaly detection. For example, one embodiment stops the robotic arm in response to detecting the anomaly. Additionally, or alternatively, another embodiment retracts the robotic arm to a safe position when an anomaly is detected. Advantageously, detection of an anomaly during the assembly process allows identification of the defective parts before they move further down in the assembly process, and thus allows prevention of further damage to the assembled parts. Furthermore, some embodiment can make compensations to the assembly process based on the feedback from the anomaly detection process.

DETAILED DESCRIPTION

Figure 1A:
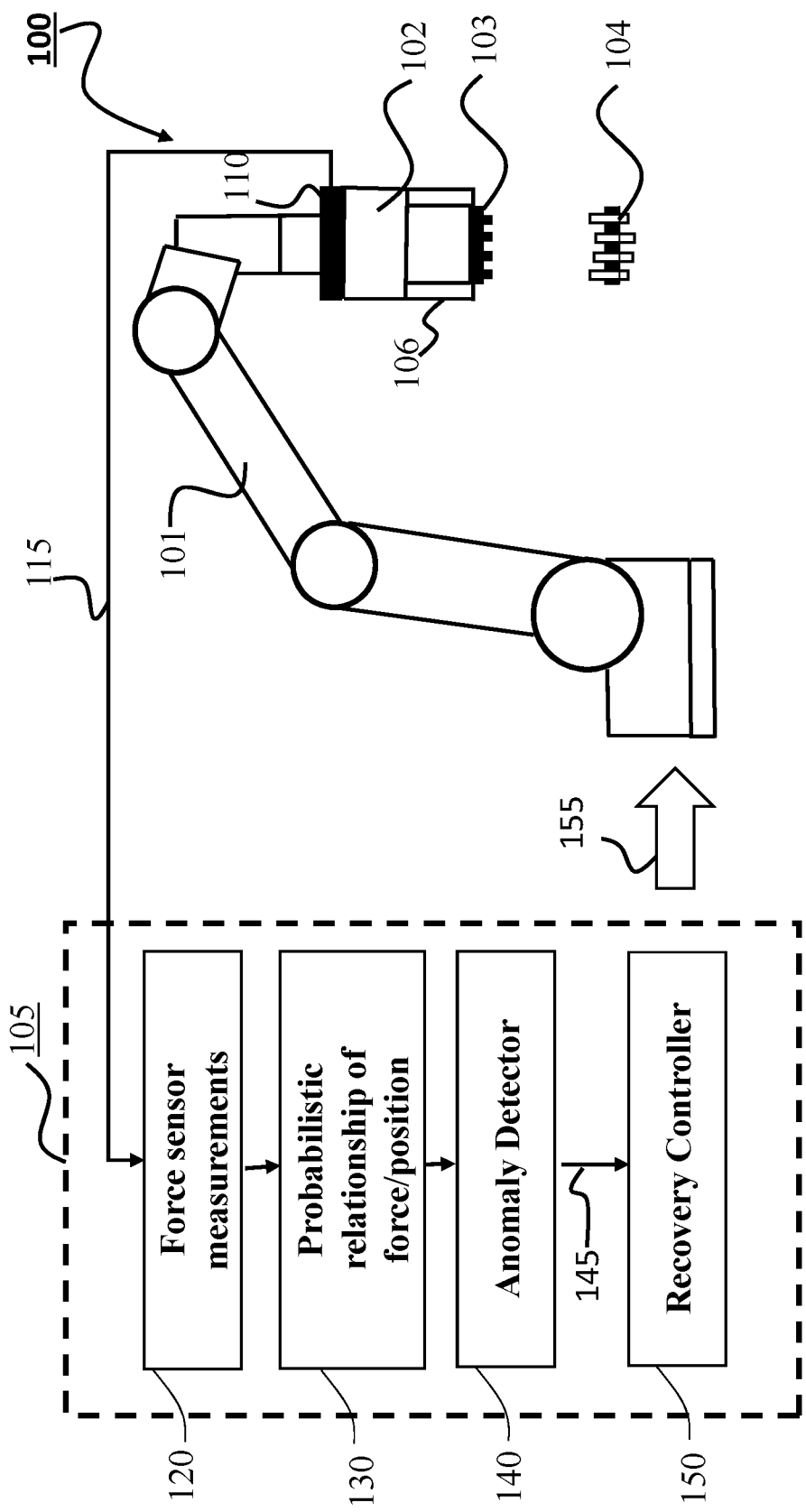
FIG. 1A shows a schematic of a robotic assembly along with a block diagram of an anomaly detection and control system according to some embodiments.

FIG. 1A shows a schematic of a robotic assembly 100 along with a block diagram of an anomaly detection and control system 105 according to some embodiments. The robotic assembly includes a robotic arm 101 for performing an operation including an insertion of a component along an insertion line to assemble a product. For example, the robotic arm inserts a first component 103 into a second component 104. In some embodiments, the robotic arm 105 includes a wrist 102 for ensuring multiple degrees of freedom of moving the component 103. In some implementations, the wrist 102 has a gripper 106 for holding the mobile component 103.

The robotic assembly 100 is configured to perform an insertion operation, e.g., insert a component 103 into a component 104, along an insertion line. As used herein, the insertion line is a trajectory of a motion of the wrist 102 defining a trajectory of the motion of the component 103. In a simple scenario, the insertion line can dictate only a vertical motion of the wrist 102. However, the wrist 102 has multiple degrees of freedom, so the insertion line can have a motion profile spanning in multi-dimensional space.

The robotic assembly 100 also includes a force sensor 110 operatively connected to the wrist of the robotic arm to measure the force tensor experienced by the end-effector of the robot during a manipulation and insertion operation. For example, the force sensor can be mounted on the wrist joint of the robot. For example, the force tensor includes measurements 115 of force and moments along the axis of the robot (Fx, Fy, Fz, Mx, My, Mz) in addition to position and orientation along three axis. Because of the flexibility of the motion of the robotic arm having a wrist, the measurement space provided by the sensor is 12 dimensional or 18 dimensional when velocities along all the axis are considered.

It is an object of an anomaly detection and control system 105 to detect anomaly of the insertion process performed by the robotic assembly 100 and to control the assembly based on results of the anomaly detection. It is another object to perform such an anomaly detection using the measurements 115 of the force sensor 110. Some embodiments are based on recognition that deterministic anomaly detection fails to consider uncertainties involved during the insertion process and thus are not robust to process noise. In addition, a probabilistic anomaly detection that models the joint distribution of all the force and moments experienced during the insertion process is a high dimensional probability density modeling problem, which is generally data inefficient. To that end, it is an object of some embodiments to perform probabilistic anomaly detection of robotic assembly in real time with practical computational requirements. However, due to high dimensionality of the measurement space provided by the sensor 102, such an anomaly detection problem is computationally challenging.

Some embodiments are based on discovery performed with a help of an exploratory data analysis (EDA), that there is stable relationship or regularity present between certain measured variables during connector mating experiments. This leads to several surprising discoveries pertinent to the underlying anomaly detection problem. Some embodiments are based on realization that there is a stable relationship between the force experienced by the wrist along the insertion line and the position of the wrist. Specifically, there is a probabilistic relationship for the force experienced by the wrist of the robotic arm along the insertion line as a probabilistic function of the position of the wrist of the robotic arm along the line of insertion. The relationship is stable, probabilistic and allows for a lower dimensional functional relationship compared to that modelled by a full joint probability distribution over all measurable variables (12 or 18 measurements).

To that end, the system 105 includes an input interface 120 configured to accept measurements of a force sensor operatively connected to the wrist of the robotic arm. The measurements include data indicative of force experienced by the wrist of the robotic arm at different positions of the wrist of the robotic arm along the line of insertion. The measurements can be the raw measurements received from the sensor 110 or any derivative of the measurements producing the data.

The system 105 also includes a memory 130 configured to store a probabilistic relationship for the force experienced by the wrist of the robotic arm along the insertion line as a probabilistic function of the position of the wrist of the robotic arm along the line of insertion. For example, the probabilistic function is learned online and/or offline from measurements of the operation repeatedly performed by one or multiple robotic arms having the configuration of the robotic arm under the control. For example, the probabilistic function can be learned from measurements of operation of the robotic arm 105 and/or from measurements of the same operation performed by different robotic arms having the same configuration as the arm 105.

The system 105 also includes an anomaly detector, implemented using a processor 140, and configured to perform anomaly detection using the probabilistic relationship stored in the memory 130 and measurements received by the input interface 120. For example, the anomaly detector is configured to determine a current value of the force and a current value of the position along the line of insertion based on the measurements of the force sensor, determine the probability of the current value of the force conditioned on the current value of the position according to the probabilistic function, and determine a result of anomaly detection based on the probability of the current value of the force.

Figure 1B:
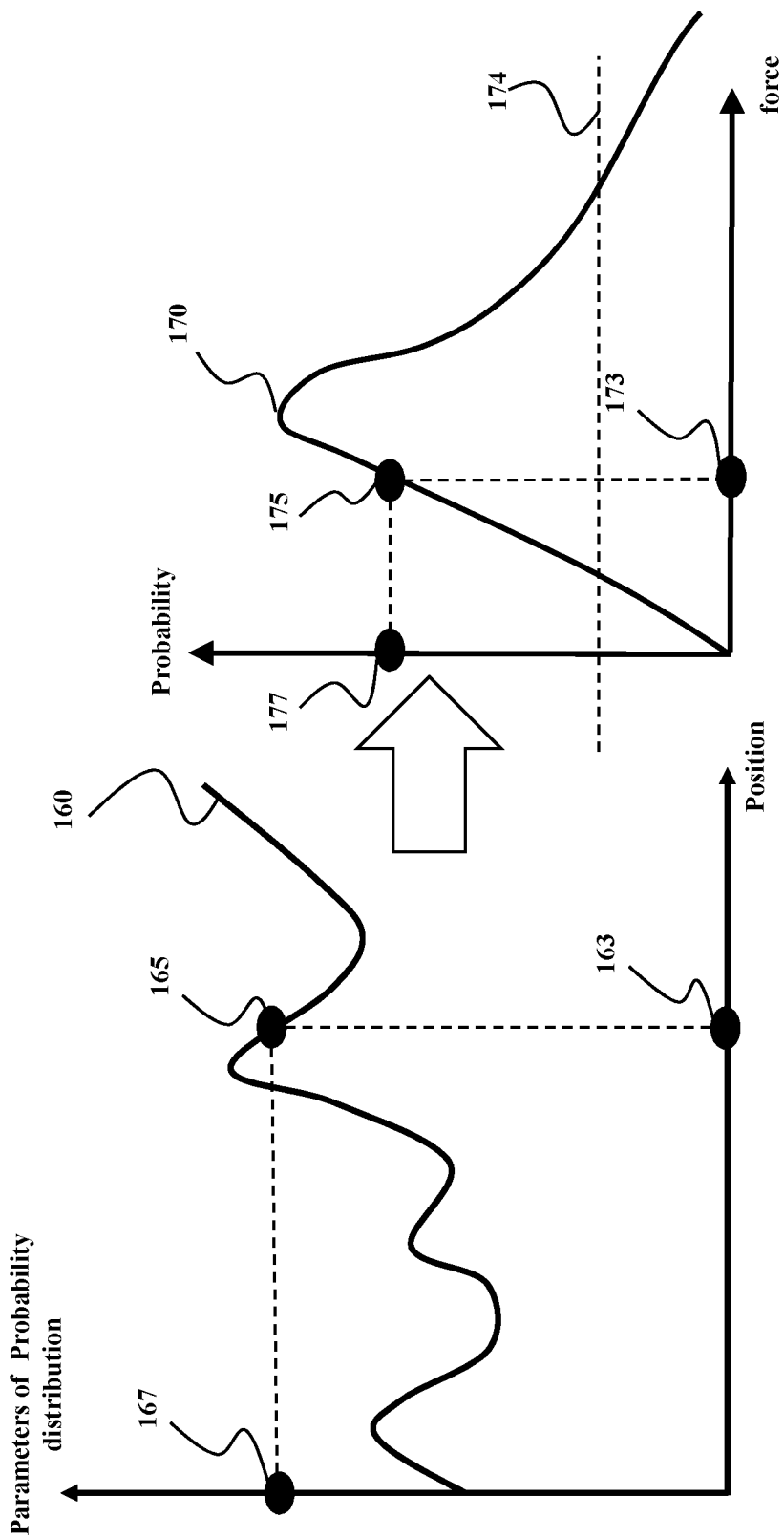
FIG. 1B shows a schematic of the probabilistic relationship used by some embodiments for detecting anomaly in robotic insertion process.
Figure 1C:
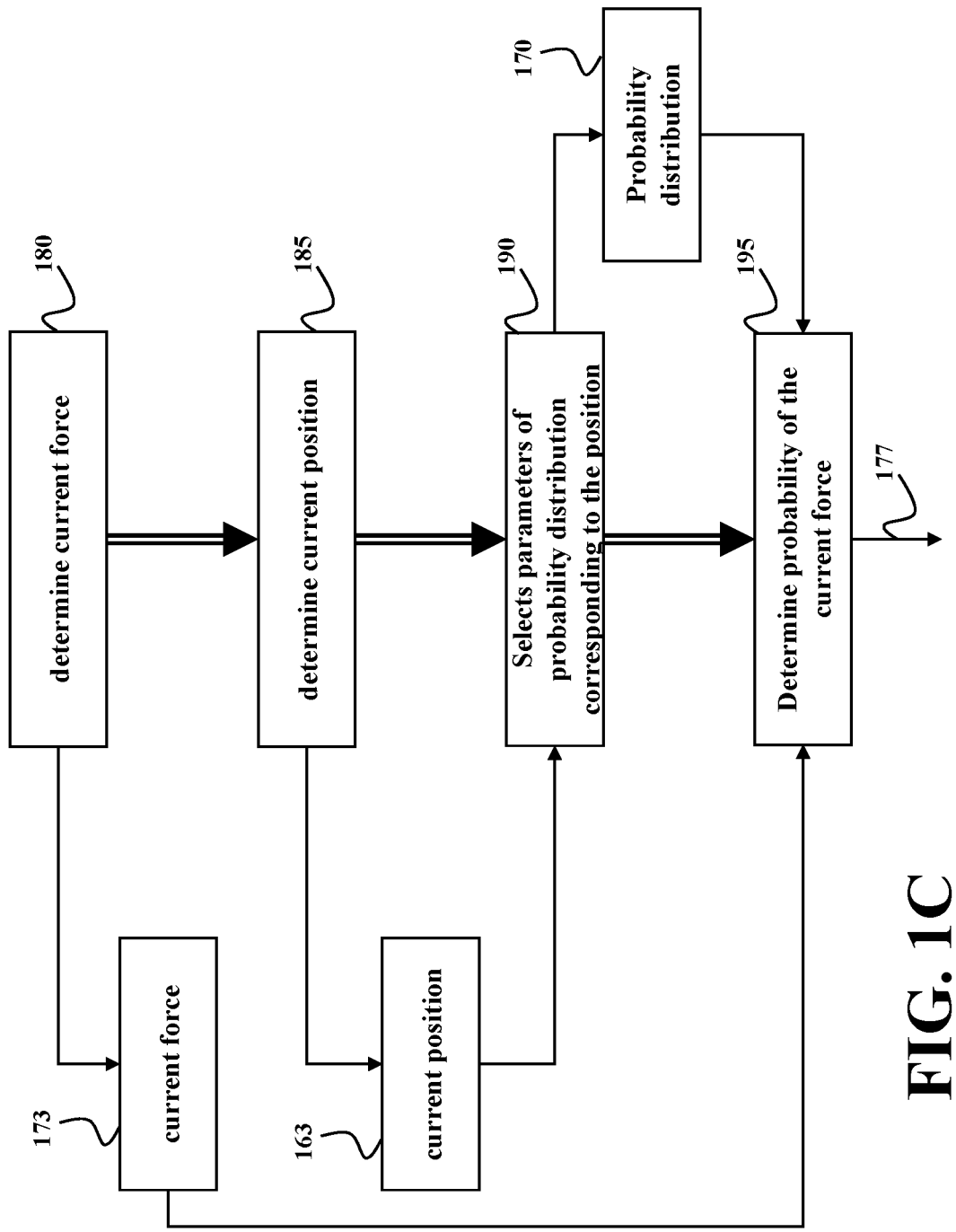
FIG. 1C shows a flow chart of a method performed by the anomaly detector to detect the anomaly according to some embodiments.

FIG. 1B shows a schematic of the probabilistic relationship used by some embodiments for detecting anomaly in robotic insertion process. FIG. 1C shows a flow chart of a method performed by the anomaly detector to detect the anomaly according to some embodiments. The probabilistic relationship defines 160 a probabilistic distribution of values of force for each value of position along the insertion line. For example, a probabilistic distribution 170 is a probabilistic distribution of values of force determined for a value of position 163.

Referring to FIGS. 1B and 1C, the anomaly detector determines 180 a current value of the force 173 and determines 185 a current value of position 163. The values of the position and the force are determined based on the measurements of the force sensor. Next, the anomaly detector selects 190 parameters 167 of the conditional probability distribution 170 corresponding to the current value 165 of the position 163, and determines 195 probability 177 of the current value 175 of the force 173 according to a probability distribution 170, e.g., a probability density function defined by the selected parameters 167.

The anomaly detector determines the result of anomaly detection based on probability of the current value of the force. When the probability of the current value of the force is high, the anomaly is less likely and the result of anomaly detection can be "no anomaly." When the probability of the current value of the force is low, the anomaly is more likely and the result of anomaly detection can be "anomaly." For example, in one embodiment, the anomaly detector compares the force probability 171 with a confidence threshold 174 to detect the anomalous force when the value 177 is less than the confidence threshold 174. In the example, of FIG. 1B, the force value 173 is normal, i.e., non-anomalous.

The system 105 also includes a recovery controller 150 configured to control the robotic arm based on the result 145 of anomaly detection. For example, the recovery controller 150 can submit a command 155 to the actuators of the robotic assembly 100. Submission of the command allows the recovery controller to stop the robotic arm in response to detecting the anomaly and/or retract the robotic arm to a safe position in response to detecting the anomaly.

Anomaly detection based on probabilistic relationship between force and position along the insertion line allows to reduce dimensionality of anomaly detection problem from 12 or 18 dimensions to just two dimensions. The dimensionality reduction allows to perform data-driven anomaly detection in real time. In addition, the probabilistic nature of the relationship is more accurate representation of a practical robotic assembly process than deterministic relationship. The probabilistic relationship allows to consider uncertainties of the anomaly detection process to increase the accuracy of the fault detection.

In one embodiment, the anomaly detector detects the anomaly when the probability of the current value of the force is less than a confidence threshold specifying the minimum value of the probability of current force. This embodiment allows to quickly reacting to the anomalous situation in robotic assembly. However, detecting the anomaly based on a single anomalous value of the force can be inaccurate in some situations.

It is an object of some embodiments to reduce false positive and/or false negative errors of anomaly detection. Some embodiments are based on recognition that these errors can be reduces when multiple values of the force have probabilities indicative of anomalous situation, as contrasted with one value of anomalous force. For example, in one embodiment, the anomaly detector detects the anomaly when probabilities of multiple values of the force are less than a confidence threshold.

In addition, some embodiments are based on recognition that for each position, the anomaly detection can be binary, i.e., the force is anomalous or normal for the current insertion. Moreover, the confidence threshold specifying the minimum value of the probability of current force can define a confidence interval indicating the normal force of successful assembly process. That confidence interval simplifies evaluation of dynamics of anomalous situations during the assembly process and allows to perform probabilistic estimation for values of force in advance, e.g., off-line.

Figure 1D:
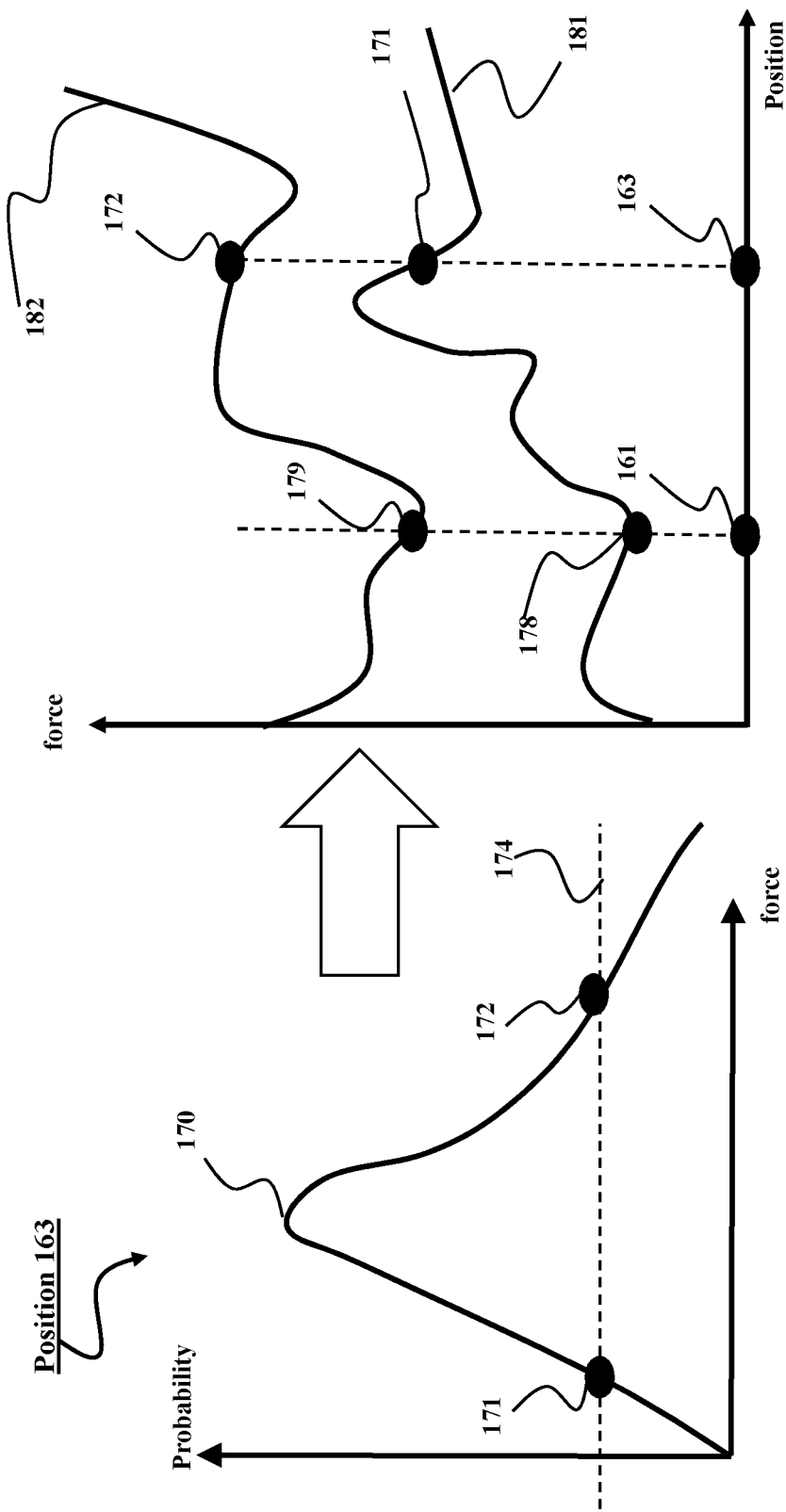
FIG. 1D shows a schematic of determining confidence intervals of values of the force according to some embodiments.

FIG. 1D shows a schematic of determining confidence intervals of values of the force according to some embodiments. For example, a position 163 has a probability distribution of the force 170 according to a probabilistic relationship 160. For a given confidence threshold 174, the probability distribution 170 defines an interval of normal, i.e., non-anomalous force values, In this example, the normal values of the force for position 163 are values between force 171 and force 172. For different positions, the confidence interval is different. For example, for position 161, the confidence interval is defined by force values 178 and 179. In combinations, multiple confidence intervals for a sequence of values of positions form a confidence corridor confined by boundaries 181 and 182. The confidence corridor defines allowed operating margin for the force as a function of position along the insertion line. In effect, the confidence interval allows detaching learning the probabilistic relationship from anomaly detection and simplifying anomaly detection for multiple position/force pairs, which can reduce the false anomaly detection rate.

Figure 2:
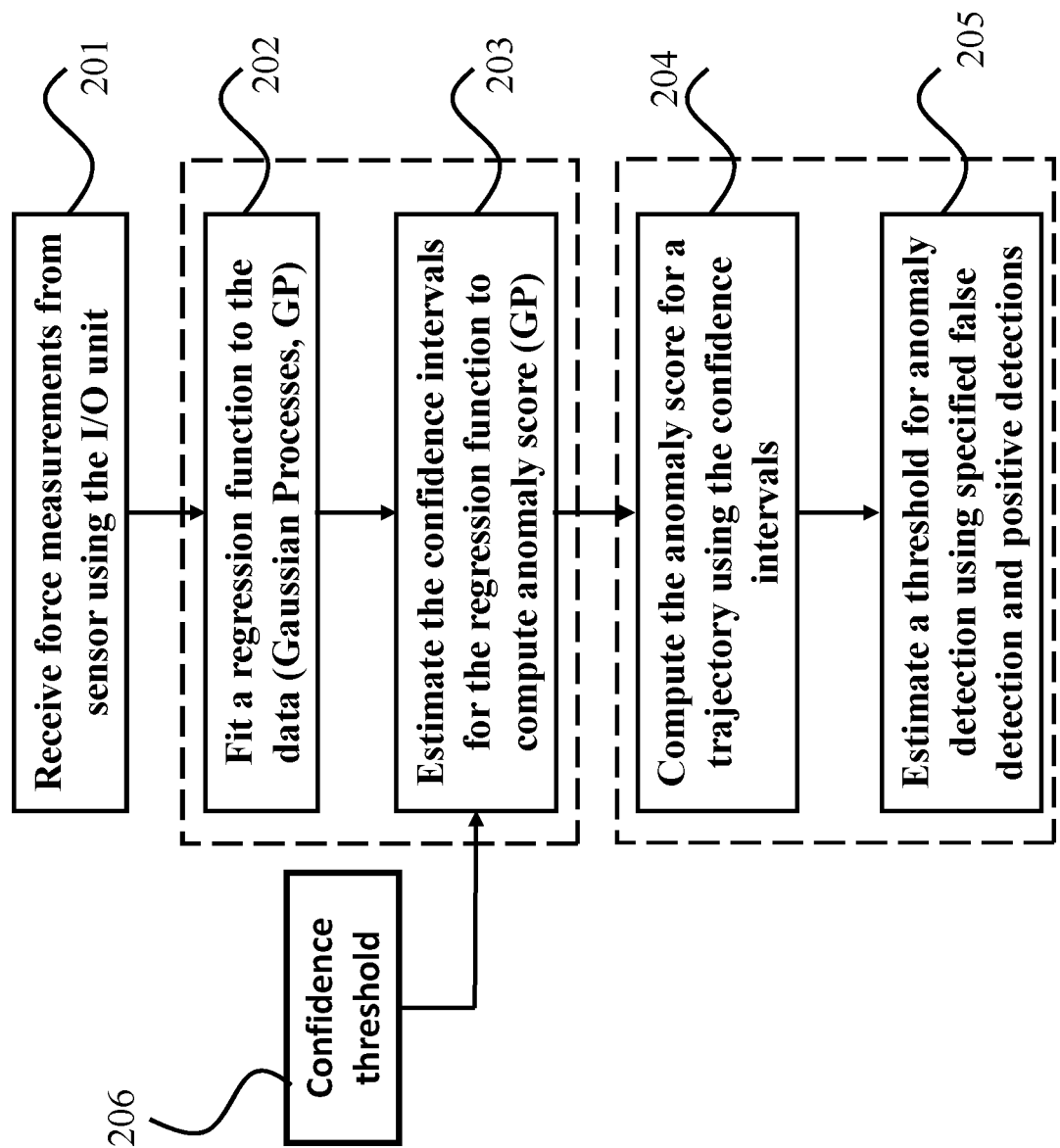
FIG. 2 shows a block diagram of a method for determining a probabilistic relationship between the force and position of a wrist of a robotic arm along an insertion line according to some embodiments.

FIG. 2 shows a block diagram of a method for determining a probabilistic relationship between the force and position of a wrist of a robotic arm along an insertion line according to some embodiments. For example, one embodiment fits a regression 202 to training data 201 for learning/estimating a probabilistic relationship between force experienced by the wrist of the robotic arm at different positions of the wrist of the robotic arm along the line of insertion.

Notably, the regression needs to be able to predict not only a prediction but the uncertainty associated with any prediction at a test data point. To that end, some embodiments use stochastic regression techniques to fit the regression model to the data. Examples of such technique include a least square support vector regression formulation with confidence interval estimation. Some of these techniques, however, are limited to independent and identically distributed (i.i.d.) measurements. Some embodiments are based on realization that in some situations of automatic robotic assembly, the force experienced by the robot depends on the trajectory of the robot to mate the parts together and thus an i.i.d. model of the measurements may be inaccurate. Consequently, in those situations, there is a need for different regression techniques.

Some embodiments use probabilistic functions defining a conditional probability distribution such that a probability distribution of the force at a position is conditioned on a previous probability distribution of the force at a previous position. In effect, such conditional probabilistic relationships increase the accuracy of anomaly detection. Examples of regression techniques allowing to determine a probabilistic function having a conditional probability distribution include Gaussian process regression.

Some embodiments are based on recognition that learning the probabilistic function defining a conditional probability distribution can be time and computationally expensive process. For example, a conditional probability distribution can be represented by a number of parameters defining a probability density function for each value of the position along the insertion line. Learning all these parameters for each value of position can be computationally expensive. Thus, there is a need to reduce computational requirements for learning the probabilistic function.

To that end, some embodiments model the underlying stable relationship between the force experienced by the robot along the direction of insertion and the position along that direction using a Gaussian process regression. A Gaussian process regression is a non-parametric statistical model where every point in the input space is associated with a normally distributed random variable. More concretely, a Gaussian process is a collection of random variables, any finite number of which is represented by a joint Gaussian distribution. As a result, a Gaussian process is completely defined by only two parameters, i.e., their mean and covariance function (also known as the kernel function). After the hyperparameters of the Gaussian process are estimated, the probability distribution of the function at any test point can be predicted using the learned regression model. To that end, some embodiments determine the probabilistic function by learning the kernel function parameterized on position along the line of insertion. In such a manner, force distribution at any test point along a trajectory is completely defined by the mean and covariance obtained from the Gaussian process. In effect, modeling the probabilistic function as the Gaussian process regression reduces computational requirements for learning the probabilistic function.

Gaussian process regression provides a mathematical framework where the prediction at a test data point is approximated by a Gaussian distribution and thus is useful for the current problem. As a result, Gaussian process regression is used for learning the probabilistic relationship for the anomaly detection problem. For example, in one embodiment, the probabilistic function is learned by fitting a Gaussian process regression model to training data defined by the measurements of the operation repeatedly performed by one or multiple robotic arms having the configuration of the robotic arm under control. For example, the Gaussian process regression model accepts a prior mean and a prior covariance to describe the training data. Typically, the prior mean is zero and the prior covariance is modeled by a kernel function. To fit the Gaussian process regression model, some embodiments determine a posterior mean and a posterior covariance function by maximizing a negative log likelihood of the Gaussian process regression model using the training data, as described, for example, in Rasmussen, Carl Edward "Gaussian processes in machine learning."

Some embodiments use a confidence threshold 206 to estimate 203 a confidence interval for each value of a position from a sequence of positions along the insertion line. The confidence threshold specifying the minimum value of the probability of current force can define a confidence interval indicating the normal force of successful assembly process. In effect, the confidence interval simplifies evaluation of dynamics of anomalous situations during the assembly process and allows to perform probabilistic estimation for values of force in advance, e.g., off-line.

Some embodiments estimate 204 an anomaly detection threshold for detection of the threshold based on multiple values of anomalous force. For example, some embodiments use a counter saving a number of times a value of a force for a current position during the insertion is anomalous. That counter is compared with the anomaly detection threshold and the anomaly is declared when the counter is greater than the anomaly detection threshold. In some implementations, the anomaly detection threshold is estimated 205 using various optimization techniques to reduce false detection rates and positive detection rates of anomaly detection for training data 201.

Figure 3:
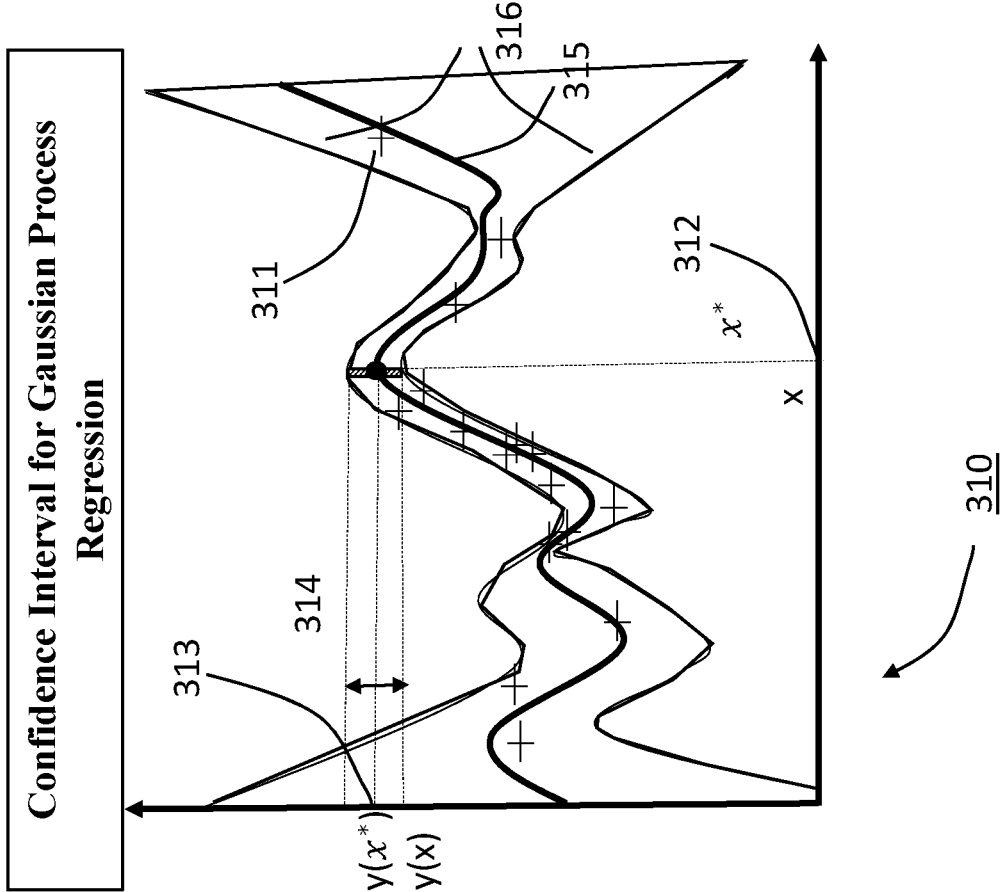
FIG. 3 shows a schematic illustrating the confidence intervals for a Gaussian distribution and the confidence interval for a prediction obtained using Gaussian process regression used by some embodiments.
Figure 3:
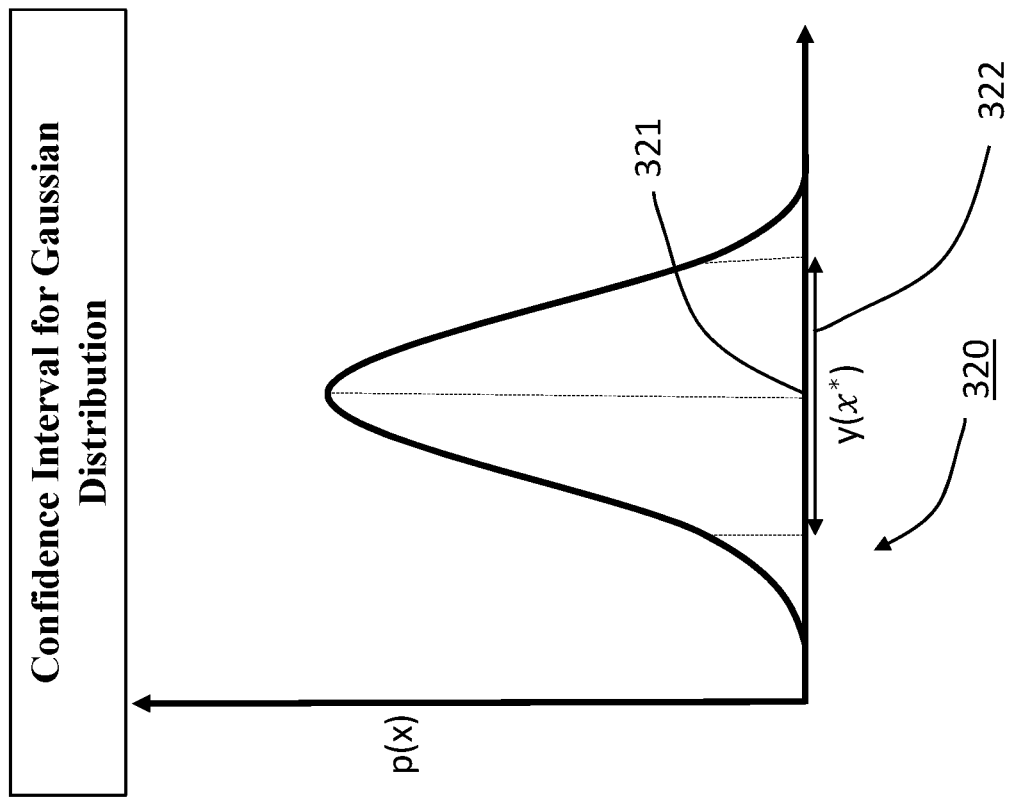

FIG. 3 shows a schematic illustrating the confidence intervals for a Gaussian distribution 320 and the confidence interval for a prediction obtained using Gaussian process regression 310 used by some embodiments. A Gaussian process is a nonparametric technique for modeling probabilistic relationships and is known for its flexibility and accuracy to infer data. Gaussian process is a stochastic process which is completely specified by a mean and covariance function.

Gaussian process can be mathematically represented using the mean function, m(x) and the covariance function k(x, x') of an insertion process $f(x)$ as follows:

$$m(x)=E[f(x)]$$

$$k(x,x')=E[(f(x)-m(x))(f(x')-m(x'))]$$

and the Gaussian process is written as follows:

$$f(x) \sim N(m(x),k(x,x')).$$

The covariance function k(x, x') is also known as the kernel function. There are several choices for a valid covariance function. Some of the most common choices are Radial Basis Function (RBF) kernel, the Matern kernel, the Squared exponential (SE) kernel, etc. Being a stochastic process, the Gaussian process is a collection of random variables, any finite collection of which are multi-variate Gaussian. After completion of the learning process from a training data set 311 D={X, Y}, the prediction at a test data point 312 x* is given by a Gaussian distribution (this can be shown using the property of multivariate Gaussian distribution). Mathematically, it is represented by the following relationships.

$$p(f(x^*)|D,x^*)=N(\mu(x^*),\Sigma(x^*))$$

$$\mu(x^*)=k_*^T(K+\sigma^2 I)^{-1}Y$$

$$\Sigma(x^*) = k_{**} - k_*^T(K + \sigma^2 I)^{-1} k_*$$

where, $\mu(x^*)$ and $\Sigma(x^*)$ represent the mean and variance of the Gaussian distribution at the test data point $x^*$. The learning process estimates the terms K, $k_{**}$ and $k_*$. Once these terms are estimated, the prediction at a new test data point is obtained using the closed form equations represented above in the equations. As a result, during the learning process, a probabilistic relationship 315 is learned for the desired input-output relationship between the coordinate of approach and the expected force experienced by the robot during insertion.

Some embodiment of the invention uses this probabilistic relationship to estimate the confidence intervals 203 using the predictive Gaussian distribution at a test data point. The confidence interval for a confidence level α 206 that defines a threshold for minimum allowed probability of the value of the force can be estimated using the parameters of the Gaussian distribution at the test data point.

The mean prediction value obtained by Gaussian process regression at a test point $x^*$ 312 is denoted by $y(x^*)$ 313 and the confidence interval 314. The learned Gaussian process regression provides the mean prediction estimate 315 at any point as well as the confidence interval 316 along the test trajectory. As the expected force distribution at any point is given by a Gaussian distribution, the force distribution at $x^*$ is shown in 320. The mean value of force 321 (313 in process 310) is $y(x^*)$ and the confidence interval is 322 (shown as 314 in process 310).

It is an object of some embodiments to reduce time and computational effort for estimating Gaussian process regression. Such a reduction can increase rapidness of deployment of anomaly detection according to some embodiments. Some embodiments are based on the realization that learning the regular Gaussian process regression can still be computationally expensive for some situations. The computational complexity of the learning varies as $O(n^3)$ where, 'n' is the number of data points. To make learning compute more efficient, some embodiments learn local Gaussian process regressions which reduce computational complexity by fitting several Gaussian process models in the data and providing a final prediction by using an expectation over all the local Gaussian process models. The local Gaussian process models then reduce the computational time required to learn the model by splitting the problem into several sub-problems with size $n_i < n$ (i=1, 2, . . . , m) and finally using these 'm' models to make a prediction. Each of the local model is fitted to a certain cluster in the dataset.

Some embodiment estimates the clusters in the data using a clustering algorithm like the k-mean clustering or the Gaussian mixture models. The input argument to these clustering algorithms is the number of clusters—the final performance of the local Gaussian process model depends on the number of clusters chosen and thus it is treated as a hyperparameter for the local Gaussian process models. After all the clusters and cluster centroids are estimated, the hyperparameters for the all the 'm' Gaussian processes are estimated using the regular marginal negative likelihood method for Gaussian processes. During the test time, a prediction for the test data point is obtained by estimating a weighted average of the predictions made by the 'm' Gaussian process models and the weights are given by the distance between the 'm' cluster centroids and the test data point. The distance can be estimated using a kernel which takes as an argument two vectors and outputs a scalar value—some common choice is the radial basis function or the regular Euclidean distance between vectors.

Figure 4:
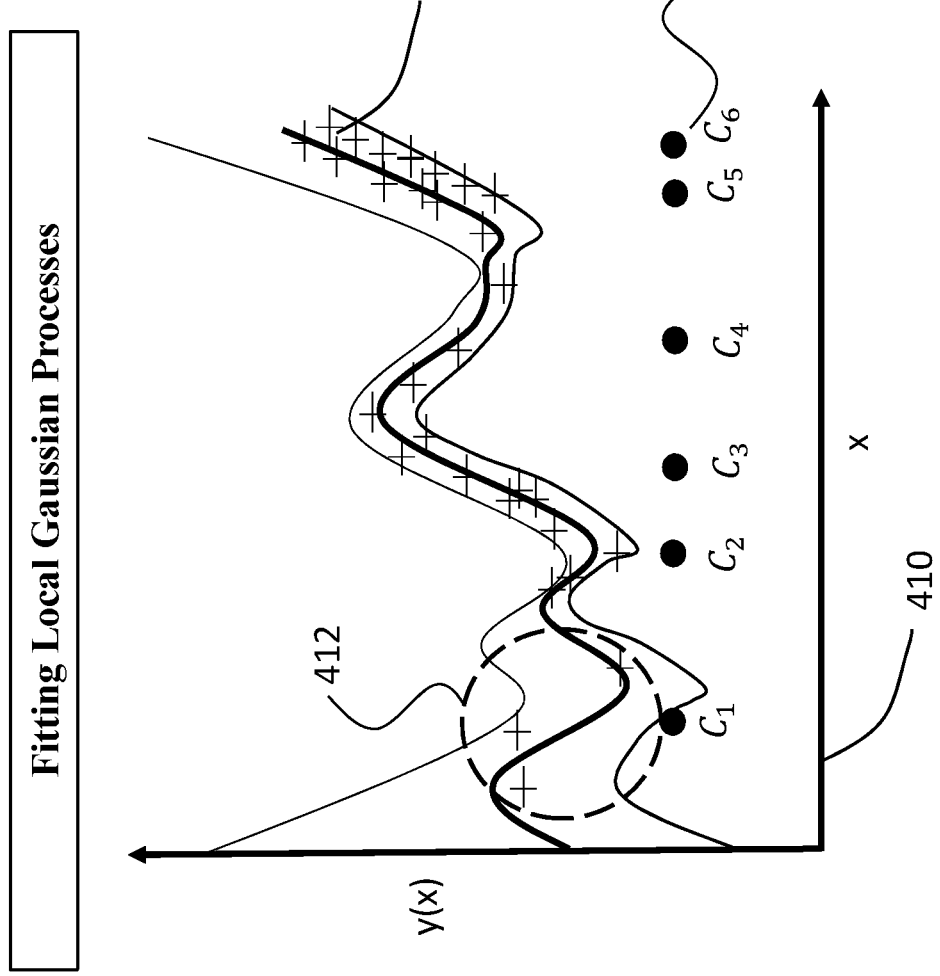
FIG. 4 shows a schematic for local Gaussian process regression used by some embodiments.

FIG. 4 shows a schematic for local Gaussian process regression used by some embodiments. Local Gaussian process regression (LGPR) 410 is a local approximation of the regular GPR with the aim to speed up the training and prediction process. The local Gaussian process regression can reduce the compute complexity of the regression problem without compromising the performance of the anomaly detection system.

Figure 5:
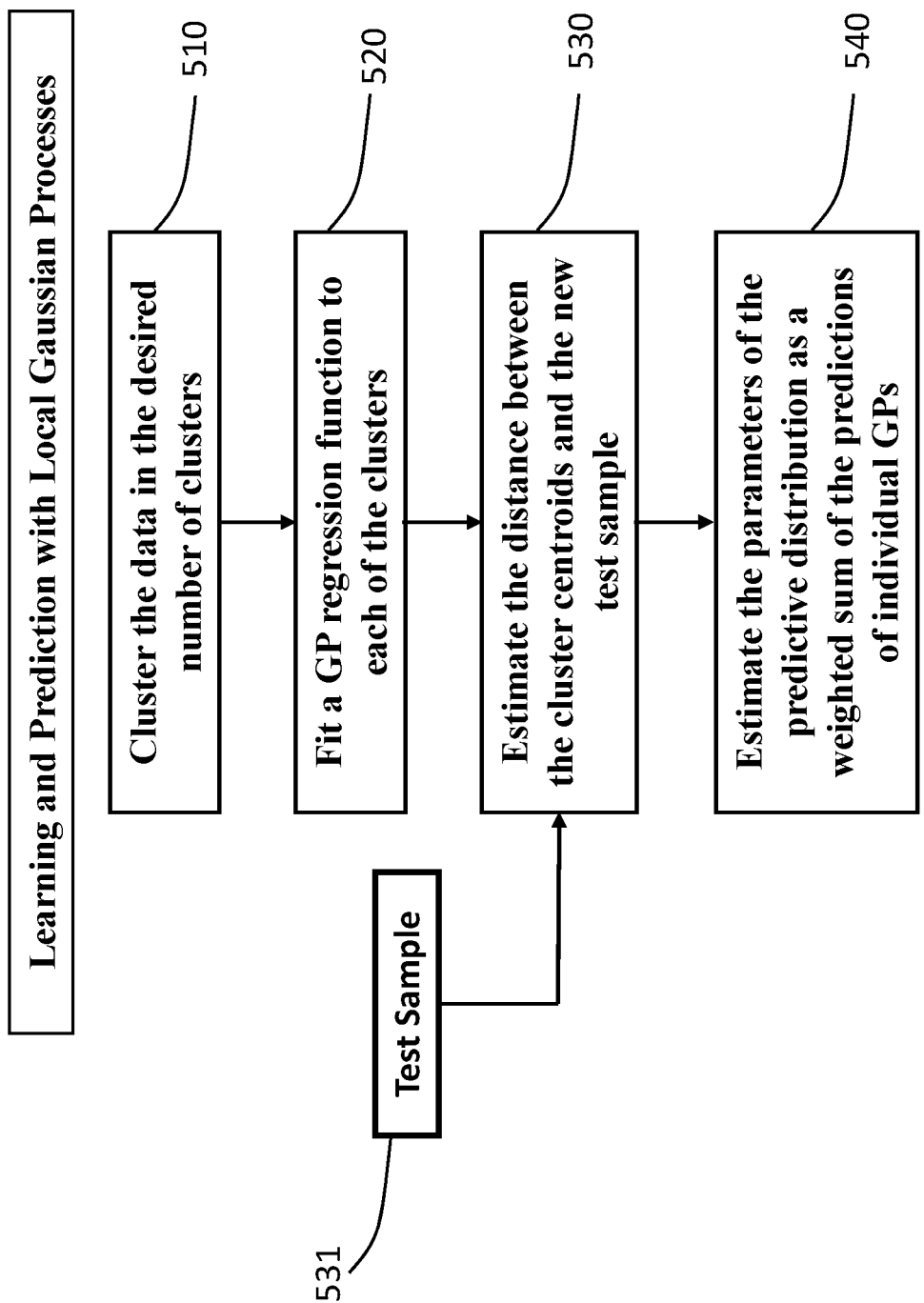
FIG. 5 shows a block diagram of a method for learning local Gaussian processes and prediction of an anomaly using local Gaussian processes according to some embodiments.

FIG. 5 shows a block diagram of a method for learning local Gaussian processes and prediction of an anomaly using local Gaussian processes according to some embodiments. In the training phase, some embodiments perform a clustering 510 of the training data set 412 into 'm' clusters. This clustering can be performed using various clustering methods of machine learning like the k-means clustering or the Gaussian mixture models (GMM). The clustering provides the center of the clusters 411 and the data points assigned to each of the cluster centroids 412. The input argument to learning the local Gaussian processes is the number of clusters to be fitted in the data set. The next step in this is to fit 520 a regular GPR in each of the clusters 412 obtained in the first step. The number of clusters in the LGPR affects the performance of the learning and thus, the number of clusters is treated as a hyperparameter that can be fine-tuned during the learning process. As the number of data points fitted in each of the 'm' GP is much less than the total number of data-points, this results in better computational efficiency during the learning phase.

Figure 6:
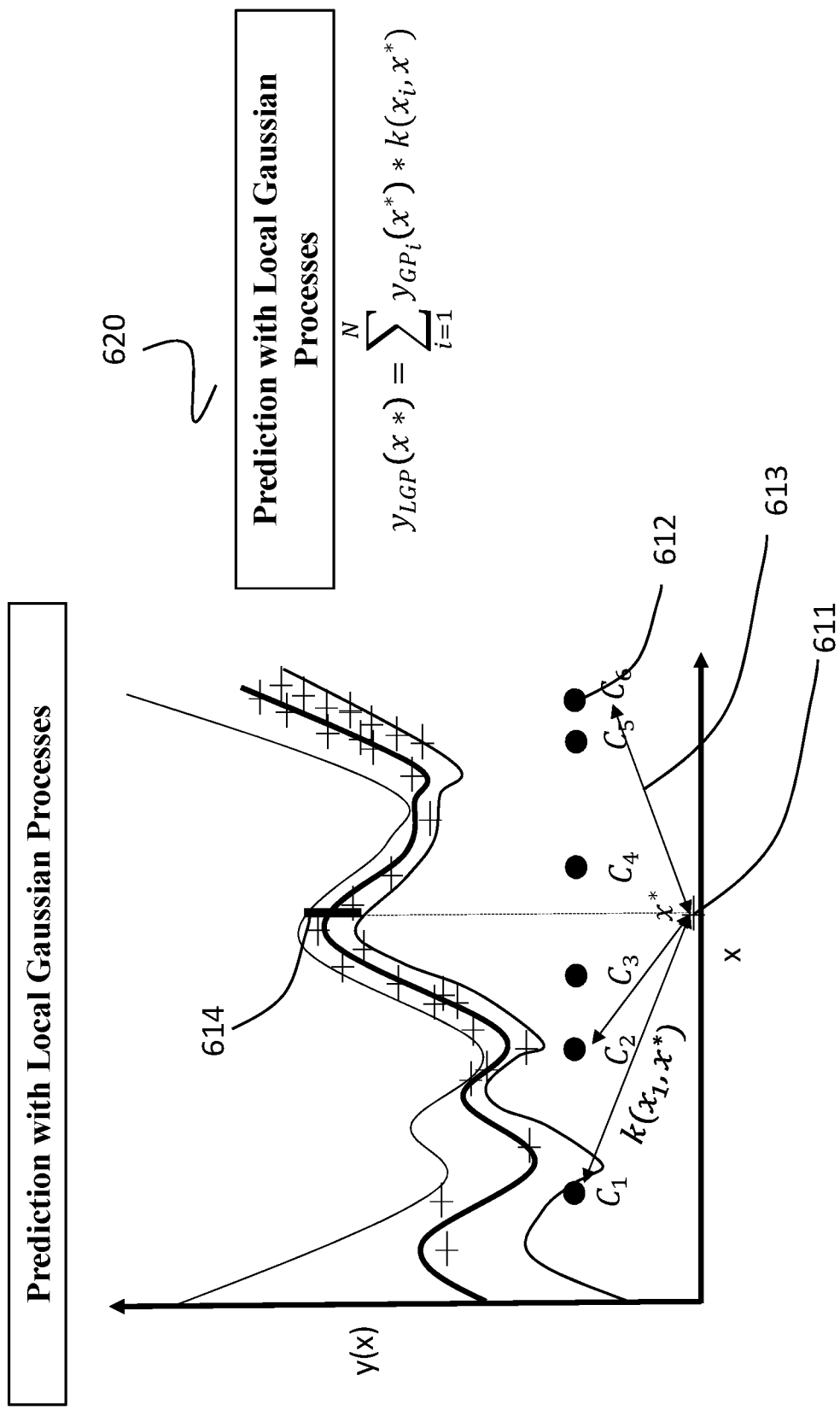
FIG. 6 shows a schematic illustrating how the local Gaussian processes are used to estimate a confidence interval of expected force distribution at a test point according to some embodiments.

FIG. 6 shows a schematic illustrating how the local Gaussian processes are used to estimate a confidence interval of expected force distribution at a test point according to some embodiments. In the test phase, the proximity between the test point 531, 611 and all the centroids 612, determined in the first step of the algorithm, is determined 530 using a distance function 613 which is denoted mathematically by $k(x, y)$ where x and y are the input arguments between which we want to compute distances and k is the distance function The distance function is another hyperparameter for the algorithm that can be optimized during the learning process. Finally, in 540 the mean and variance of the posterior 614 Gaussian distribution at a test data point $x^*$ is obtained as the weighted average 620 of the predictions obtained from the individual Gaussian process models. Mathematically, the prediction distribution at a test data point obtained by a Gaussian process can be written as follows:

$$p_{LGP}(f(x^*) | D, x^*) = N(\mu_{LGP}(x^*), \Sigma_{LGP}(x^*))$$

$$\mu_{LGP}(x^*) = \frac{\sum_{i=1}^{m} k(x_i, x^*) \mu_i(x^*)}{\sum_{i=1}^{m} k(x_i, x^*)}$$

$$\Sigma_{LGP}(x^*) = \frac{\sum_{i=1}^{m} k(x_i, x^*) \Sigma_i(x^*)}{\sum_{i=1}^{m} k(x_i, x^*)}$$

where, 'm' is the number of clusters obtained in the first step of the algorithm, $\mu_i(x^*)$ and $\Sigma_i(x^*)$ are the mean and covariance obtained by the '$i^{th}$' GP as explained earlier.

Figure 7:
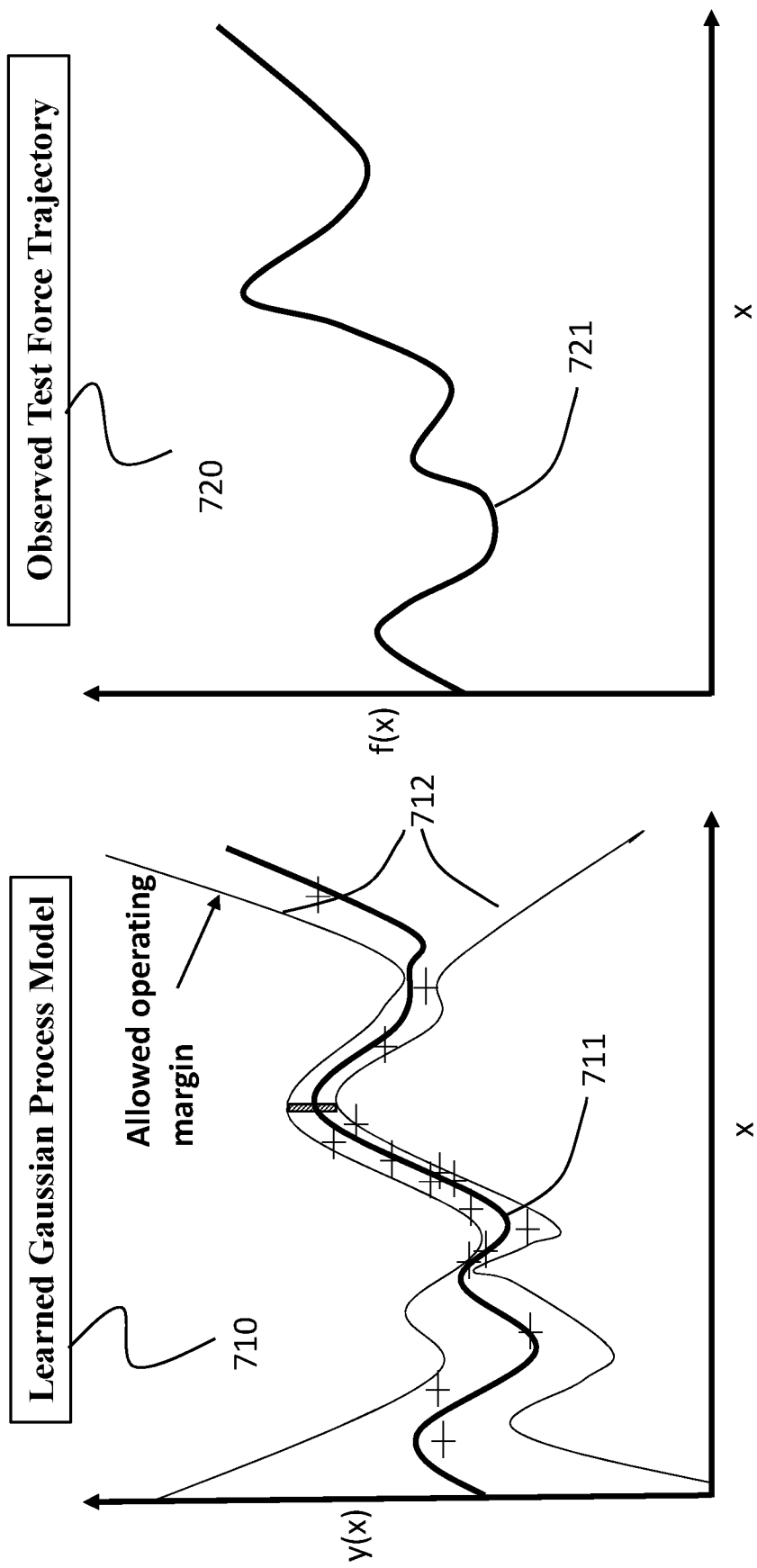
FIG. 7 shows a schematic of a method for computing an anomaly score using the learned Gaussian process regression according to some embodiments.

FIG. 7 shows a schematic of a method for computing an anomaly score using the learned Gaussian process regression (either the regular or local Gaussian process regression) for a trajectory 720 according to some embodiments. A trajectory is a sequence of position points $\{(x_1, f(x_1)), (x_2, f(x_2)), \ldots, (x_n, f(x_n))\}$ 721. At every point along the trajectory, the force measurements are compared with the learned Gaussian process model 710. Using the predicted mean value 711 and the covariance function, the observed value of the force is compared with the allowable operating margin 712 of the confidence interval to compute an anomaly score for the observed measurement. This is repeated for all or some points along the observed trajectory 721 and then summed up to compute an anomaly score for the entire trajectory or its portion. The anomaly score is compared with anomaly threshold to determine a result of anomaly detection.

Different implementations use different computations of anomaly score. For example, in some implementations, three possible anomaly score for a specific point along the trajectory are considered, namely binary anomaly score, continuous anomaly score and hybrid anomaly score. In the binary anomaly score implementation, a force measurement is given an anomaly score of one if it lies outside of the confidence interval, and a score of zero if it lies within the confidence interval. In the continuous anomaly score implementation, a force measurement is given an anomaly score corresponding to how likely it is to observe such value given the corresponding multivariate Gaussian probability distribution. This value is computed as 1 minus the evaluation of the multivariate Gaussian probability distribution at the specific force measurement. In the hybrid anomaly score implementation, a force measurement is given an anomaly score of zero if it lies within the confidence interval and a score higher than zero, computed as in the continuous anomaly score, if it lies outside of the confidence interval. With all and each of these implementations the total anomaly score for the entire insertion can be obtained by averaging the anomaly scores for all the points along the observed test trajectory. The proposed anomaly detection algorithm is agnostic to the choice of the anomaly score computation. Notice also that several others continuous anomaly scores can be selected and therefore applied also to the hybrid anomaly scores depending e.g. on the variance of the multivariate Gaussian distribution or on the likelihood function. Some embodiment determine a result of anomaly detection based on comparison of the probability with an anomaly detection threshold, e.g., declare anomaly when the probability is above the anomaly detection threshold.

Figure 8:
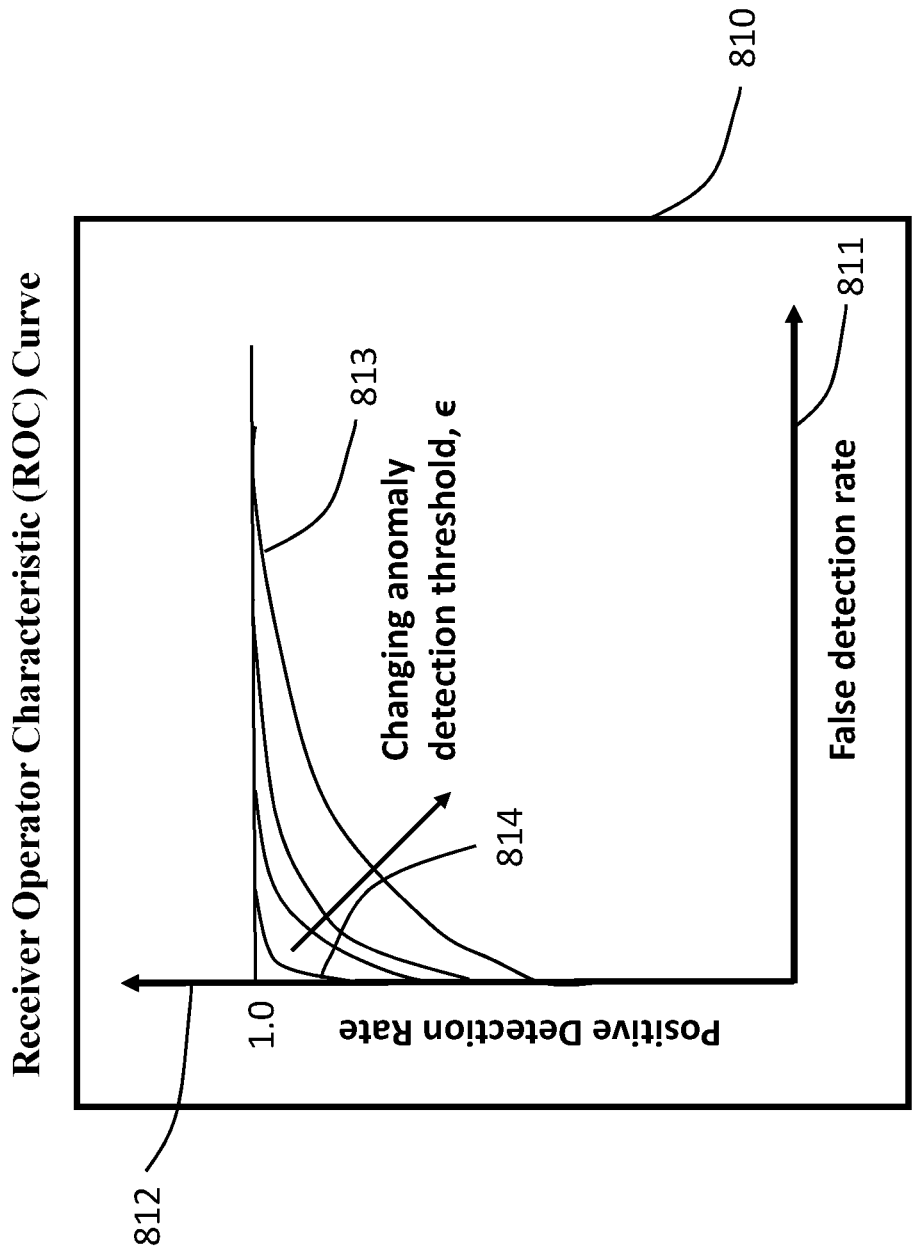
FIG. 8 shows a schematic illustrating a method for estimating an anomaly detection threshold according to one embodiment.

FIG. 8 shows a schematic illustrating a method for estimating an anomaly detection threshold according to one embodiment. This embodiment optimizes the value of anomaly detection threshold using a receiver operating characteristic (ROC) curve 810 balancing allowable false detection rate and expected positive detection rate of anomalies. This embodiment is based on recognition that the decision threshold for declaring an anomaly can be optimized for a target false detection 811 and positive detection rate 812 using a ROC curve. False detection rate 811 is the number of times when the anomaly detector declares a normal sample as anomalous, and positive detection rate 812 is the number of times when the anomaly detector correctly detects the anomalous sample.

In a ROC curve, the positive detection rate is plotted against the false detection rate for an array of possible threshold values 813. Each threshold value results in a different trade-off between positive detection rate and false positive rate. In FIG. 8, ROC curves for multiple detection methods are shown. Among them, the curve that is above and to the left of all other curves is the best. This curve can also be selected as the one with maximal area under it.

Once the optimal curve 814 is identified, the optimal threshold is then selected from it. This selection can be done in a variety of ways. One method is to select a desired detection rate on the vertical axis. Another method is to select a limit on the false positive rate on the horizontal axis. A third method is to select the threshold that minimizes a weighted combination of true and false positive rates, where the weights come from economic considerations (e.g., how does the cost of a failure to detect an anomaly, possibly resulting in defective product or damage to the equipment, compares to the cost of a false positive, possibly resulting in unnecessary stoppage).

Figure 9:
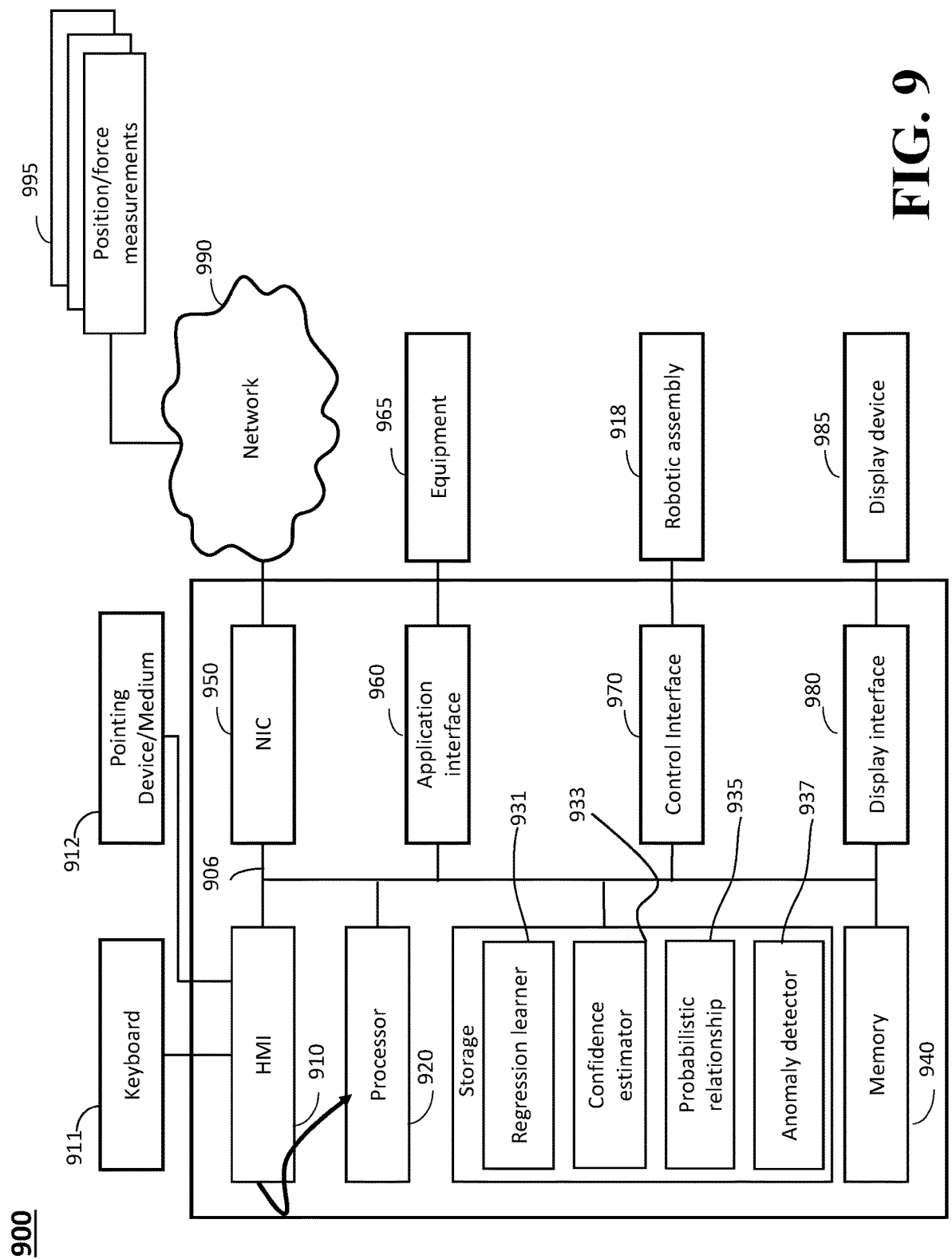
FIG. 9 shows a block diagram of a system for controlling a robotic arm performing an operation including an insertion of a component along an insertion line to assemble a product according to some embodiments.

FIG. 9 shows a block diagram of a system 900 for controlling a robotic arm performing an operation including an insertion of a component along an insertion line to assemble a product according to some embodiments. A configuration of the robotic arm includes a wrist having a motion with multiple degrees of freedom. The system 900 includes one or combination of learning and control components. The learning components are configured to estimate the probabilistic relationship for the force experienced by the wrist of the robotic arm along the insertion line as a probabilistic function of the positions of the wrist of the robotic arm along the line of insertion. For example, the probabilistic relationship defines a confidence interval for non-anomalous values of the force for each position of a sequence of positions on the insertion line, wherein each of the non-anomalous values of the force for the current position has a probability above a confidence level according to the probabilistic function learned for the current position, and wherein the anomaly detector declares the current value of the force anomalous when the current value of the force is outside of the confidence interval for non-anomalous values of the force of the current position. The control components are configured to use the learned probabilistic relationship to estimate the anomalous values of the force indicative of anomalies in the robotic assembly.

The control system 900 can have a number of interfaces connecting the system 900 with other systems and devices. A network interface controller 950 is adapted to connect the system 900 through the bus 906 to a network 990 connecting the control system 900 with outputs of the force sensors 102. Through the network 990, either wirelessly or through the wires, the system 900 can receive the measurements 995 of the force and positions of the robotic assembly. During the training stage, the measurements 995 can be measurements of the operation repeatedly performed by one or multiple robotic arms having the configuration of the robotic arm under the control. During the control stage, the measurements 995 can be measurements of the operation of the robotic arm under the control.

In some implementations, a human machine interface 910 within the system 900 connects the system to a keyboard 911 and pointing device 912, wherein the pointing device 912 can include a mouse, trackball, touchpad, joy stick, pointing stick, stylus, or touchscreen, among others. Through the interface 910 or NIC 950, the system 900 can receive values of a confidence threshold and/or anomaly detection threshold. The system 900 includes an output interface configured to output results of training the probabilistic relationship and/or the results of anomaly detection. For example, the output interface can include a memory to render the probabilistic relationship and/or the results of anomaly detection. For example, the system 900 can be linked through the bus 906 to a display interface 980 adapted to connect the system 900 to a display device 985, such as a computer monitor, camera, television, projector, or mobile device, among others. The system 900 can also be connected to an application interface 960 adapted to connect the system to equipment 965 for performing various robotic assembly operations.

The system 900 can also be connected to a control interface 970 adapted to connect the system to a robotic arm 918.

The system 900 includes a processor 920 configured to execute stored instructions, as well as a memory 940 that stores instructions that are executable by the processor. The processor 920 can be a single core processor, a multi-core processor, a computing cluster, or any number of other configurations. The memory 940 can include random access memory (RAM), read only memory (ROM), flash memory, or any other suitable memory systems. The processor 920 is connected through the bus 906 to one or more input and output devices. These instructions implement a method for controlling a robotic arm.

To that end, the control system 900 includes a regression learner 931 configured to learn the probabilistic relationship 935. The regression learner 931 can learn the probabilistic relationship 935 offline and can be omitted from a configuration of the system 900 for online control. Examples of learning the probabilistic relationship 935 use Gaussian process regression and/or local Gaussian process regression.

In some embodiments, the confidence estimator 933 determines a confidence interval for non-anomalous values of the force for each position of a sequence of positions on the insertion line and/or anomaly detection threshold for determining a result of anomaly detection based on multiple instances of detecting anomalous force. In some embodiments, the confidence estimator 933 determines the anomaly threshold to reduce false detection rate by optimizing a receiver operating characteristic (ROC) curve balancing allowable false detection rate and expected positive detection rate of anomalies.

The system 900 also includes an anomaly detector 937 configured to determine the probability of the current value of the force conditioned on the current value of the position according to the probabilistic function and determine a result of anomaly detection based on the probability of the current value of the force. For example, when the confidence interval for non-anomalous values of the force for each position of a sequence of positions on the insertion line is determined, the anomaly detector 937 declares the current value of the force anomalous when the current value of the force is outside of the confidence interval for non-anomalous values of the force of the current position.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. A system for controlling a robotic arm performing an operation including an insertion of a component along an insertion line to assemble a product, wherein a configuration of the robotic arm includes a wrist having a motion with multiple degrees of freedom, comprising:
    an input interface configured to accept measurements of a force sensor operatively connected to the wrist of the robotic arm, the measurements include data indicative of force experienced by the wrist of the robotic arm at different positions of the wrist of the robotic arm along the insertion line;
    a memory configured to store a probabilistic relationship for the force experienced by the wrist of the robotic arm along the insertion line as a probabilistic function of the positions of the wrist of the robotic arm along the line of insertion, wherein the probabilistic function is learned from measurements of the operation repeatedly performed by one or multiple robotic arms having the configuration of the robotic arm under the control; and
    at least one processor configured to run executable components comprising an anomaly detector configured to
        determine a current value of the force and a current value of the position along the line of insertion based on the measurements of the force sensor;
        determine the probability of the current value of the force conditioned on the current value of the position according to the probabilistic function; and
        determine a result of anomaly detection based on the probability of the current value of the force; and
    a recovery controller configured to control the robotic arm based on the result of anomaly detection,
    wherein the probabilistic function has a conditional probability distribution such that a probability distribution of the force at a position is conditioned on a previous probability distribution of the force at a previous position, wherein the anomaly detector selects parameters of the conditional probability distribution corresponding to the current value of the position, and determines probability of the current value of the force according to a probability distribution defined by the selected parameters.

2. The system of claim 1, wherein the probabilistic function is a Gaussian process regression defined by values of mean and covariance of the force for each value of the position of the wrist of the robotic arm along insertion line, wherein the anomaly detector selects the mean and the variance from the Gaussian process regression corresponding to the current value of the position and determines the probability of the current value of the force according to a Gaussian distribution defined by the selected values of the mean and the variance.

3. The system of claim 1, wherein the anomaly detector determine the result of anomaly detection based on comparison of the probability of the current value of the force with a confidence threshold.

4. The system of claim 3, wherein the anomaly detector detects the anomaly when the probabilities of multiple values of the force are less than the confidence threshold.

5. The system of claim 1, wherein the probabilistic relationship defines a confidence interval for non-anomalous values of the force for each position of a sequence of positions on the insertion line, wherein each of the non-anomalous values of the force for the current position has a probability above a confidence level according to the probabilistic function learned for the current position, and wherein the anomaly detector declares the current value of the force anomalous when the current value of the force is outside of the confidence interval for non-anomalous values of the force of the current position.

6. The system of claim 5, wherein the probabilistic function includes a set of local Gaussian process regressions, wherein each local Gaussian process regression is learned for a subset of positions along the insertion line clustered around a cluster position and is defined by values of mean and covariance of the force for each position in the sequence of positions of the wrist of the robotic arm along the insertion line, wherein the confidence interval for non-anomalous values of the force for the current position is based a weighted combination of a set of local probabilities selected according to the set of local Gaussian process regressions, wherein the weight for each local probability for the current position is a function of a distance from a cluster position of the corresponding local Gaussian process regression to the current position.

7. The system of claim 5, wherein the anomaly detector declares the result of anomaly detection as anomalous when a number of anomalous values of the force is greater than an anomaly threshold.

8. The system of claim 7, wherein the anomaly threshold is determined to reduce false detection rate by optimizing a receiver operating characteristic (ROC) curve balancing allowable false detection rate and expected positive detection rate of anomalies.

9. The system of claim 1, wherein the recovery controller stops the robotic arm in response to detecting the anomaly.

10. The system of claim 1, wherein the recovery controller retracts the robotic arm to a safe position in response to detecting the anomaly.

11. The system of claim 10, wherein the recovery controller determines the safe position based on the probability of the value of the force at the safe position.

12. The system of claim 1, wherein the input interface is configured to accept the probabilistic function and to store the probabilistic function in the memory, wherein the probabilistic function is learned by fitting a Gaussian process regression model to training data defined by the measurements of the operation repeatedly performed by one or multiple robotic arms having the configuration of the robotic arm under the control.

13. The system of claim 12, wherein the Gaussian process regression model accepts a prior mean and a prior covariance to describe the training data, wherein the prior mean is zero and the prior covariance is modeled by a kernel function, and wherein the fitting of the Gaussian process regression model includes determining a posterior mean and a posterior covariance function by maximizing a negative log likelihood of the Gaussian process regression model using the training data.

14. A method for controlling a robotic arm repeatedly performing an operation including an insertion of a component along an insertion line to assemble a product, wherein a configuration of the robotic arm includes a wrist having a motion with multiple degrees of freedom, wherein the method uses a processor coupled with stored instructions implementing the method, wherein the instructions, when executed by the processor carry out steps of the method, comprising:
    accepting measurements of a force sensor operatively connected to the wrist of the robotic arm, the measurements include data indicative of force experienced by the wrist of the robotic arm at different positions of the wrist of the robotic arm along the line of insertion;
    accepting a probabilistic relationship for the force experienced by the wrist of the robotic arm along the insertion line as a probabilistic function of the position of the wrist of the robotic arm along the line of insertion, wherein the probabilistic function is learned from measurements of the operation repeatedly performed by one or multiple robotic arms having the configuration of the robotic arm under the control;
    determining a current value of the force and a current value of the position along the line of insertion based on the measurements of the force sensor;
    determining the probability of the current value of the force conditioned on the current value of the position according to the probabilistic function;
    determining a result of anomaly detection based on the probability of the current value of the force; and
    controlling the robotic arm based on the result of anomaly detection, wherein the probabilistic function is a Gaussian process regression defined by values of mean and covariance of the force for each value of the position of the wrist of the robotic arm along insertion line, comprising:
    selecting the mean and the variance from the Gaussian process regression corresponding to the current value of the position; and
    determining the probability of the current value of the force according to a Gaussian distribution defined by the selected values of the mean and the variance.

15. The method of claim 14, wherein the probabilistic function is a set of local Gaussian process regressions, wherein each local Gaussian process regression corresponds to its cluster position along the insertion line and is defined by values of mean and covariance of the force for each value of the position of the wrist of the robotic arm along insertion line, comprising:
    selecting the mean and the variance from each of the local Gaussian process regression corresponding to the current value of the position to produce a set of local Gaussian distributions defined by selected pairs of the mean and the variance;
    determining a local probability of the current value of the force according to each of the local Gaussian distribution to produce a set of local probabilities; and
    determining the probability of the current value of the force conditioned on the current value of the position as a weighted combination of the local probabilities, wherein the weight for a local probability is a function of a distance from a cluster position of the corresponding local Gaussian process regression to the current value of the position.

16. The method of claim 14, wherein the probabilistic function is a set of local Gaussian process regressions, wherein each local Gaussian process regression corresponds to its cluster position along a portion of the insertion line centered on the cluster position and is defined by values of mean and covariance of the force for each value of the position of the wrist of the robotic arm along the portion of the insertion line, comprising selecting a local Gaussian process regression having its cluster position closest to the current value of the position;

selecting the mean and the variance from the selected local Gaussian process regression corresponding to the current value of the position; and determining the probability of the current value of the force according to a Gaussian distribution defined by the selected values of the mean and the variance.

17. The method of claim 14, comprising:
detecting the anomaly when probabilities of multiple values of the force are less than a confidence threshold.

18. A non-transitory computer readable storage medium embodied thereon a program executable by a processor for performing a method, the method comprising:

accepting measurements of a force sensor operatively connected to a wrist of the robotic arm, the measurements include data indicative of force experienced by the wrist of the robotic arm at different positions of the wrist of the robotic arm along a line of insertion;

accepting a probabilistic relationship for the force experienced by the wrist of the robotic arm along the insertion line as a probabilistic function of the position of the wrist of the robotic arm along the line of insertion, wherein the probabilistic function is learned from measurements of the operation repeatedly performed by one or multiple robotic arms having the configuration of the robotic arm under the control;

determining a current value of the force and a current value of the position along the line of insertion based on the measurements of the force sensor;

determining the probability of the current value of the force conditioned on the current value of the position according to the probabilistic function;

determining a result of anomaly detection based on the probability of the current value of the force; and controlling the robotic arm based on the result of anomaly detection, wherein the probabilistic function is a set of local Gaussian process regressions, wherein each local Gaussian process regression corresponds to its cluster position along the insertion line and is defined by values of mean and covariance of the force for each value of the position of the wrist of the robotic arm along insertion line, comprising:

selecting the mean and the variance from each of the local Gaussian process regression corresponding to the current value of the position to produce a set of local Gaussian distributions defined by selected pairs of the mean and the variance;

determining a local probability of the current value of the force according to each of the local Gaussian distribution to produce a set of local probabilities; and determining the probability of the current value of the force conditioned on the current value of the position as a weighted combination of the local probabilities, wherein the weight for a local probability is a function of a distance from a cluster position of the corresponding local Gaussian process regression to the current value of the position.

19. A system for controlling a robotic arm performing an operation including an insertion of a component along an insertion line to assemble a product, wherein a configuration of the robotic arm includes a wrist having a motion with multiple degrees of freedom, comprising:

an input interface configured to accept measurements of a force sensor operatively connected to the wrist of the robotic arm, the measurements include data indicative of force experienced by the wrist of the robotic arm at different positions of the wrist of the robotic arm along the insertion line;

a memory configured to store a probabilistic relationship for the force experienced by the wrist of the robotic arm along the insertion line as a probabilistic function of the positions of the wrist of the robotic arm along the line of insertion, wherein the probabilistic function is learned from measurements of the operation repeatedly performed by one or multiple robotic arms having the configuration of the robotic arm under the control; and at least one processor configured to run executable components comprising an anomaly detector configured to determine a current value of the force and a current value of the position along the line of insertion based on the measurements of the force sensor;

determine the probability of the current value of the force conditioned on the current value of the position according to the probabilistic function; and determine a result of anomaly detection based on the probability of the current value of the force; and a recovery controller configured to control the robotic arm based on the result of anomaly detection, wherein the probabilistic relationship defines a confidence interval for non-anomalous values of the force for each position of a sequence of positions on the insertion line, wherein each of the non-anomalous values of the force for the current position has a probability above a confidence level according to the probabilistic function learned for the current position, and wherein the anomaly detector declares the current value of the force anomalous when the current value of the force is outside of the confidence interval for non-anomalous values of the force of the current position.

20. A system for controlling a robotic arm performing an operation including an insertion of a component along an insertion line to assemble a product, wherein a configuration of the robotic arm includes a wrist having a motion with multiple degrees of freedom, comprising:

an input interface configured to accept measurements of a force sensor operatively connected to the wrist of the robotic arm, the measurements include data indicative of force experienced by the wrist of the robotic arm at different positions of the wrist of the robotic arm along the insertion line;

a memory configured to store a probabilistic relationship for the force experienced by the wrist of the robotic arm along the insertion line as a probabilistic function of the positions of the wrist of the robotic arm along the line of insertion, wherein the probabilistic function is learned from measurements of the operation repeatedly performed by one or multiple robotic arms having the configuration of the robotic arm under the control; and at least one processor configured to run executable components comprising an anomaly detector configured to determine a current value of the force and a current value of the position along the line of insertion based on the measurements of the force sensor;

determine the probability of the current value of the force conditioned on the current value of the position according to the probabilistic function; and determine a result of anomaly detection based on the probability of the current value of the force; and a recovery controller configured to control the robotic arm based on the result of anomaly detection, wherein the input interface is configured to accept the probabilistic function and to store the probabilistic function in the memory, wherein the probabilistic function is learned by fitting a Gaussian process regression model to training data defined by the measurements of the operation repeatedly performed by one or multiple robotic arms having the configuration of the robotic arm under the control.

* * * * *